(12) United States Patent
Itogawa (10) Patent No.: US 11,487,484 B2
(45) Date of Patent: Nov. 1, 2022

(54) PRINTING APPARATUS

(71) Applicant: BROTHER KOGYO KABUSHIKI KAISHA, Nagoya (JP)

(72) Inventor: Yoshihiro Itogawa, Mizuho (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/472,832

(22) Filed: Sep. 13, 2021

(65) Prior Publication Data

US 2022/0091798 A1 Mar. 24, 2022

(30) Foreign Application Priority Data

Sep. 23, 2020 (JP) .............................. JP2020-158177

(51) Int. Cl.
*G06F 3/12* (2006.01)
*G06K 15/02* (2006.01)

(52) U.S. Cl.
CPC .......... *G06F 3/1229* (2013.01); *G06F 3/1207* (2013.01); *G06F 3/1221* (2013.01); *G06F 3/1248* (2013.01); *G06K 15/1823* (2013.01)

(58) Field of Classification Search
CPC .... G06F 3/1229; G06F 3/1207; G06F 3/1221; G06F 3/1248; G06K 15/1823
USPC ....................................................... 358/1.13
See application file for complete search history.

(56) References Cited

U.S. PATENT DOCUMENTS

| | | | |
|---|---|---|---|
| 2011/0043855 A1* | 2/2011 | Ono ..................... | G06F 3/1215 358/1.15 |
| 2012/0250094 A1* | 10/2012 | Matsuda ............ | G06K 15/1857 358/1.17 |
| 2015/0339561 A1* | 11/2015 | Takenaka ............. | G06F 3/1222 358/1.14 |
| 2016/0026901 A1* | 1/2016 | Matsui ..................... | G06T 1/00 358/1.13 |
| 2019/0034768 A1* | 1/2019 | Nakahara ........... | G06K 15/1822 |
| 2020/0272376 A1* | 8/2020 | Coulter ................. | G06F 3/1284 |

FOREIGN PATENT DOCUMENTS

JP 2015-123712 A 7/2015

* cited by examiner

*Primary Examiner* — Allen H Nguyen
(74) *Attorney, Agent, or Firm* — Scully, Scott, Murphy & Presser, PC (57) ABSTRACT

A printing apparatus includes a print engine and a first controller configured to generate a raster data from a print job and cause the print engine to perform a print process based on the raster data. The first controller includes a first core and a second core. The first core is configured perform an analyzing process of analyze a job control command included in the print job and the second core is configured to perform an RIP process of generating the raster data from a PDL command.

18 Claims, 8 Drawing Sheets

FIG. 1

```
                                    ┌─ JD
┌───────────────────────────────────┴────────────────┐
│                                                    │
│  EC%-12345X@PJL                                    │
│  @PJL  SET  HOLD=OFF                               │
│  @PJL  SET  USERNAME  ="○○○"                       │
│  @PJL  SET  JOBNAME  ="office-PDF(A&A4).pdf"       │
│  @PJL  SET  LOGINUSER  ="○○○"                      │
│  @PJL  JOB  NAME  ="Office-PDF(A&A4).pdf"          │
│  @PJL  SET  LOGINDOMAIN  ="AP"                     │
│  @PJL  PRINTLOG ITEM =1, PRINTER                   │
│  @PJL  PRINTLOG ITEM =2,Web,18 Sep 2019 09:13      ⎬ H
│  @PJL  PRINTLOG ITEM =3, ○○○                       │
│  @PJL  PRINTLOG ITEM =4,APBIL2022283               │
│  @PJL   SET JOBTIME ="20190918091304"              │
│                                                    │
│  @PJL  SET RENDERMODE =COLOR                       │
│  @PJL  SET COLORADAPT =ON                          │
│  @PJL  SET RESOLUTION =600                         │
│  @PJL  SET APTMODE =B8H                            │
│  @PJL  SET COLORMODE =AUTO                         │
│  @PJL  SET BRIGHTNESS =0                           │
│  @PJL  SET CONTRAST =0                             │
│              ·                                     │
│              ·                                     │
│  ┌─────────────────────────────────────────┐       │
│  │ @PJL  ENTER LANGUAGE=PCLXL              │       │
│  └─────────────────────────────────────────┘       │
│  ─ ─ ─ ─ ─ ─ ─ ─ ─ ─ ─ ─ ─ ─ ─ ─ ─ ─ ─ ─ ─ ─       │
│                                                    │
│  )HP-PCL XL;2;0                                    │
│       ·                                            │
│       ·                                            ⎬ B
│                  (BODY OF PDL)                     │
│       ·                                            │
│       ·                                            │
│  ─ ─ ─ ─ ─ ─ ─ ─ ─ ─ ─ ─ ─ ─ ─ ─ ─ ─ ─ ─ ─ ─       │
│                                                    │
│  EC%-12345X@PJL EOJ NAME ="Office-PDF(A&A4).pdf"   ⎬ F
│  EC%-12345X                                        │
└────────────────────────────────────────────────────┘
```

PRINTING APPARATUS

CROSS-REFERENCE TO RELATED APPLICATIONS

This application claims priority under 35 U.S.C. § 119 from Japanese Patent Application No. 2020-158177 filed on Sep. 23, 2020. The entire subject matter of the application is incorporated herein by reference.

BACKGROUND

Technical Field

The present disclosures relate to a technology of printing images based on a print job.

Related Art

There has been known a printing apparatus equipped with a print engine and a controller configured to cause the print engine to perform a printing process. Generally, the controller analyzes PDL (abbreviation for Page Description Language) commands included in a print job and generates raster data. Based on the thus generated raster data, the controller causes the print engine to print an image on a print medium.

The print job contains, in addition to the PDL command, job control commands, which represent information for controlling the print job. The controller generally analyzes the job control commands and generates the raster data based on the PDL commands in accordance with the analysis results of the job control commands.

SUMMARY

In recent years, there have been increasing demands on printing apparatuses. For example, there is a need to reduce the time required to complete a printing process after receiving an instruction from a terminal to perform the printing process. On the other hand, the functions required of printing apparatuses are becoming more diverse, and the amount of data in print jobs is increasing in order to realize the required functions. As a result, there is a concern that the processing load on the controller will increase in the printing process.

According to aspects of the present disclosures, there is provided a printing apparatus, comprising a print engine, and a controller. The controller is configured to generate raster data based on a print job and control the print engine to perform printing based on the generated raster data, the print job being data containing a job control command and a PDL command, the job control command being a command to control the print job, a PDL command being a command to generate the raster data. The controller comprises a first core which is a processor core configured to perform, in the printing, an analyzing process, the analyzing process being a process to analyzing the job control command contained in the print job, and a second core which is another processor core configured to perform a RIP process, the RIP process being a process of generating the raster data based on the PDL command.

DETAILED DESCRIPTION OF THE EMBODIMENTS

First Embodiment

Figure 1:
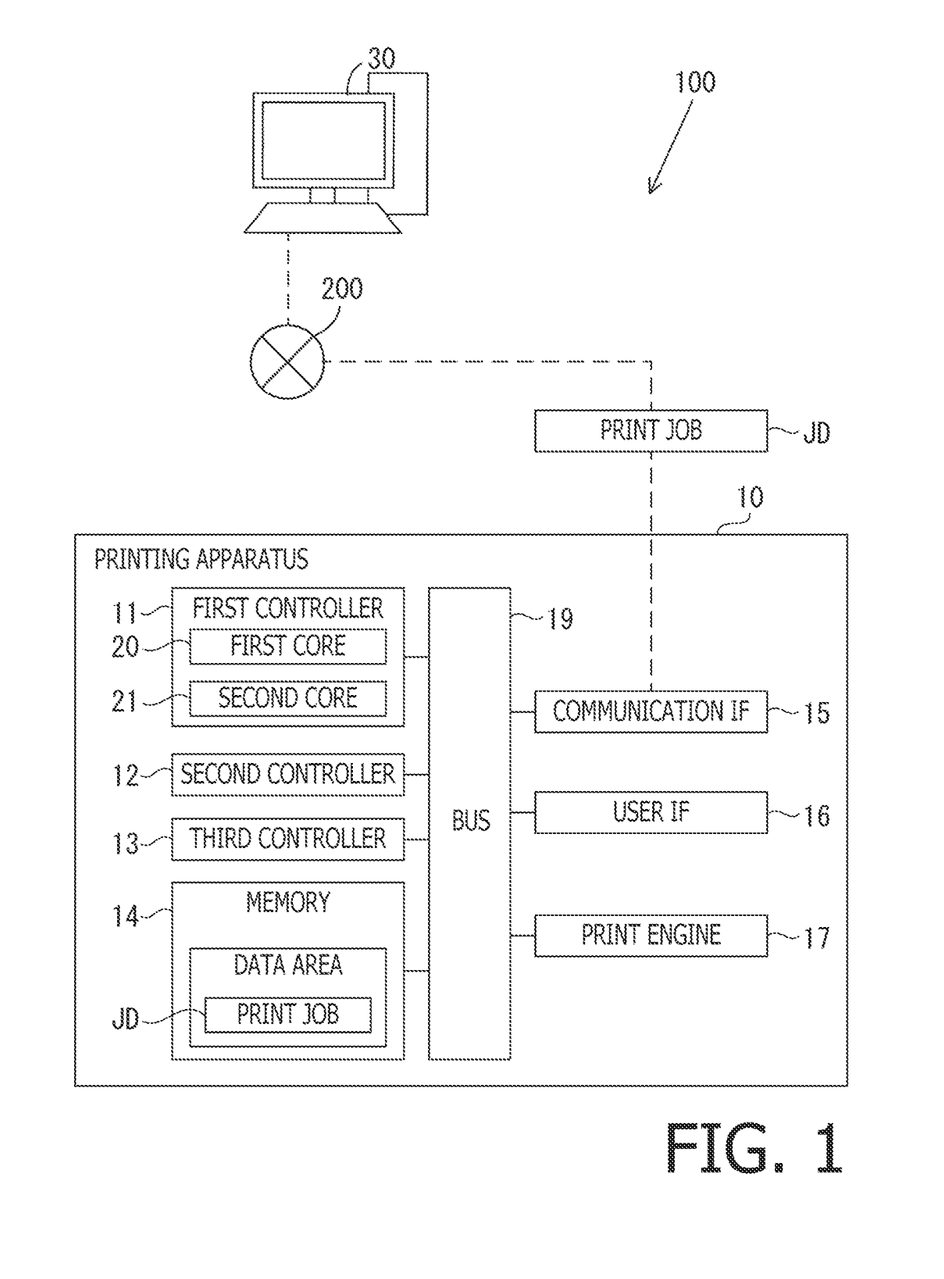
FIG. 1 is a block diagram showing a configuration of a printing system according to an embodiment of the present disclosures.

A printing system 100 shown in FIG. 1 is equipped with a printing apparatus 10 and a terminal 30. The printing apparatus 10 and the terminal 30 are connected to a network 200 and are configured to communicate through the network 200. The network 200 may be the Internet, a LAN, or a combination of a LAN and the Internet. In addition, the network 200 may be a wired network, a wireless network, or a combination of the wired and wireless networks. According to a specific embodiment, the printing apparatus 10 and the terminal 30 are connected wirelessly to a router (not-shown) that forms a part of the network.

The printing apparatus 10 is equipped with a first controller 11, a second controller 12, a third controller 13, a memory 14, a communication IF 15, a user IF 16, a print engine 17, and a bus 19. It is noted that "IF" is an abbreviation for "interface."

The communication IF 15 connects the printing apparatus 10 to the network 200 in accordance with a particular communication protocol. The user IF 16 is an interface between the printing apparatus 10 and a user who directly operates the printing apparatus 10. The user IF 16 includes, for example, a touch panel or operation keys.

The print engine 17 executes a printing process to print images on recording media such as sheets or disks. In this embodiment, a printing method of the print engine 17 can be an inkjet printing method, an electrophotographic imaging method, or the like. The print engine 17 has an image forming mechanism configured to print the recording agent on the recording medium, and a conveyance mechanism configured to convey the recording medium to the image forming mechanism. The image forming mechanism has a cartridge that contains the recording agent. The cartridge has an IC chip, which can be used to communicate with the third controller 13 for authentication of the cartridge and notification of a remaining amount of recording agent. The conveyance mechanism has a sheet feed roller that feeds the recording media and a conveying roller that conveys the recording medium to the image forming mechanism.

The first controller 11 generates raster data based on the print job JD when causing the print engine 17 to perform the printing process. The first controller 11 is a multi-core CPU having a first core 20 and a second core 21 as processor cores. The first core 20 and the second core 21 are configured to communicate with each other by a well-known method such as an MCAPI (abbreviation of "Multi-core Communications API"). In this embodiment, a clock frequency of the second core 21 is higher than a clock frequency of the first core 20, and the second core 21 can perform a process with a higher load than a process than the first core 20 can perform.

The first controller 11 is configured to make the second core 21 transition between two operation modes, that is, an operating mode and a sleep mode. The sleep mode is an operation mode in which power consumption is lower than the operating mode. When the second core 21 is not operated, the first controller 11 can reduce the power consumption of the first controller 11 by shifting the second core 21 from the operating mode to the sleep mode.

Each of the second controller 12 and third controller 13 has a single processor core and is configured, for example, by a single-core CPU. The second controller 12 and the third controller 13 perform processes other than that designed to be performed by the first controller 11. For example, the second controller 12 causes the print engine 17 to execute a feeding operation by controlling the rotation drive of the rollers that the conveyance mechanism has when the print engine 17 executes a printing process. Further, the second controller 12 controls the drive of each part of the image forming mechanism during the printing process. The third controller 13 controls a communication with the IC chip that the cartridge has and blinking of an LED (not shown).

Each of the processes executed by the second and third controllers 12 and 13 has a lower processing load than the process executed by the first controller 11. In other words, the first controller 11 is a controller configured to perform processes with a higher processing load than the second and third controllers 12 and 13 can perform.

The memory 14 is configured by a combination of a RAM, a ROM, an SSD, an HDD, and the like. The buffers provided to the first to third controllers 11 to 13, which are used when various programs are executed, may also be regarded as part of the memory 14. The memory 14 may be a storage medium that can be read by the first to third controllers 11 to 13. A storage medium readable by any of the first to third controllers 11 to 13 is a non-transitory medium. In addition to the above examples, the non-transitory media also include recording media such as CD-ROMs, DVDs, and ROMs. The non-transitory medium is also a tangible medium. On the other hand, an electrical signal carrying a program downloaded from a server or the like on a network 200 is a computer-readable signal medium, which is a type of computer-readable medium, but is not included in the non-transitory computer-readable storage medium.

This embodiment mainly shows the processes of the first controller 11 according to the instructions described in the program. It is noted that the processes of "determining," "extracting," "selecting," "calculating," "deciding," "identifying," "obtaining," "receiving," "controlling," and the like in the following description represent the processes of the first controller 11. It is noted that "obtaining" is used in a concept that does not require a request. In other words, the process of receiving data without a request by the first controller 11 is also included in the concept of "obtaining" data by the first controller 11. Further, "data" in this specification is represented by a bit string that can be read by the controller. Further, data with the same substantive meaning content but different formats will be treated as the same data. The same applies to "information" in this specification.

Figure 2:
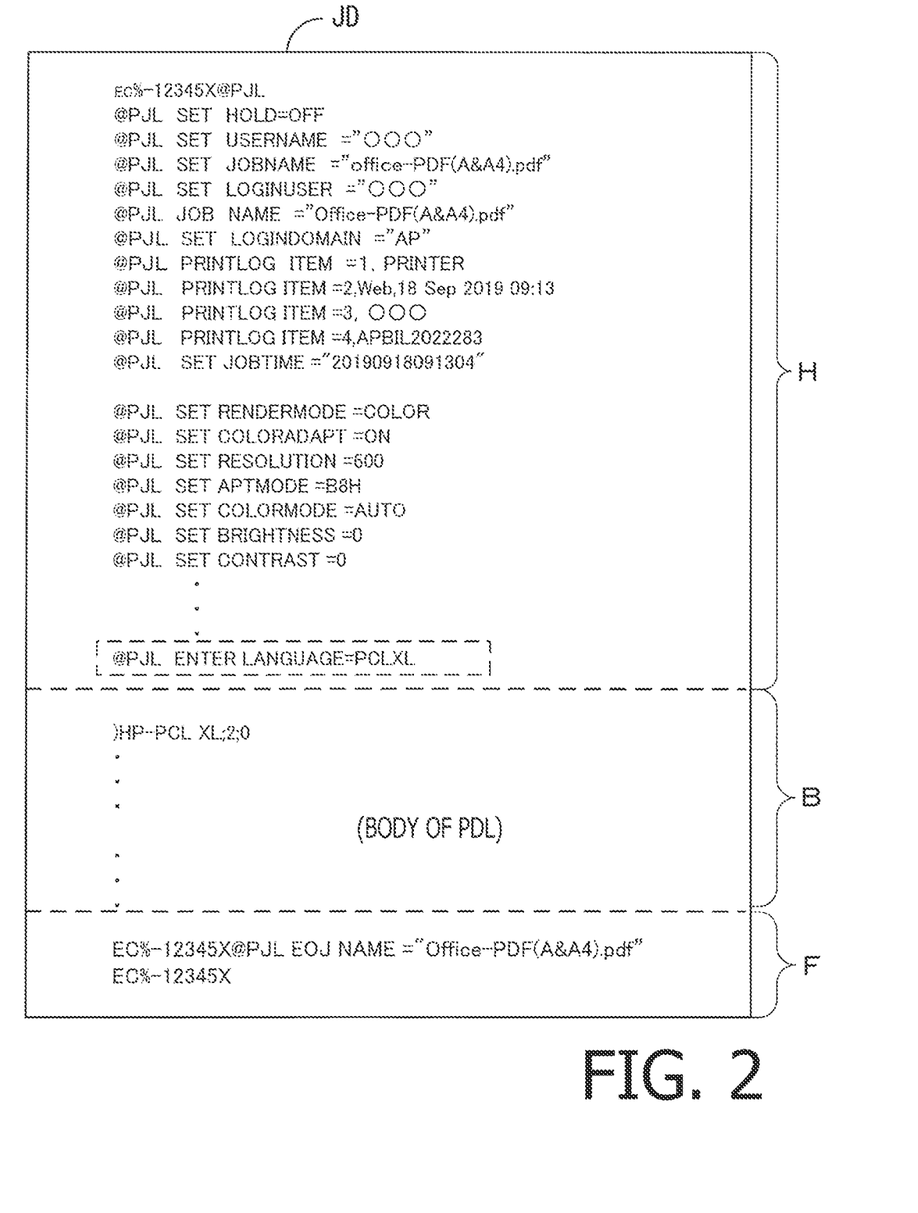
FIG. 2 shows an example of a print job.

The memory 14 is provided with a data storage area. The data storage area is an area for storing data necessary for the execution of programs, and the like. When printing is performed, the data storage area of the memory 14 stores the print job JD transmitted from the terminal 30. As shown in FIG. 2, the print job JD has a header area H, a body area B, and a footer area F in order from the top. The header area H and the footer area F are the areas where the job control commands to control the print job JD are recorded. In the print job JD shown in FIG. 2, the job control commands are written in the PJL (abbreviation for Printer Job Language). The body area B is the area where the PDL command for drawing a page is recorded.

The terminal 30 is equipped with a not-shown CPU, a memory, a user IF, a display, and a network IF. The memory of the terminal 30 stores the OS and a printer driver. The printer driver is configured to generate a print job JD based on image data generated by a not-shown application in response to an operation instruction from the user.

Figure 3:
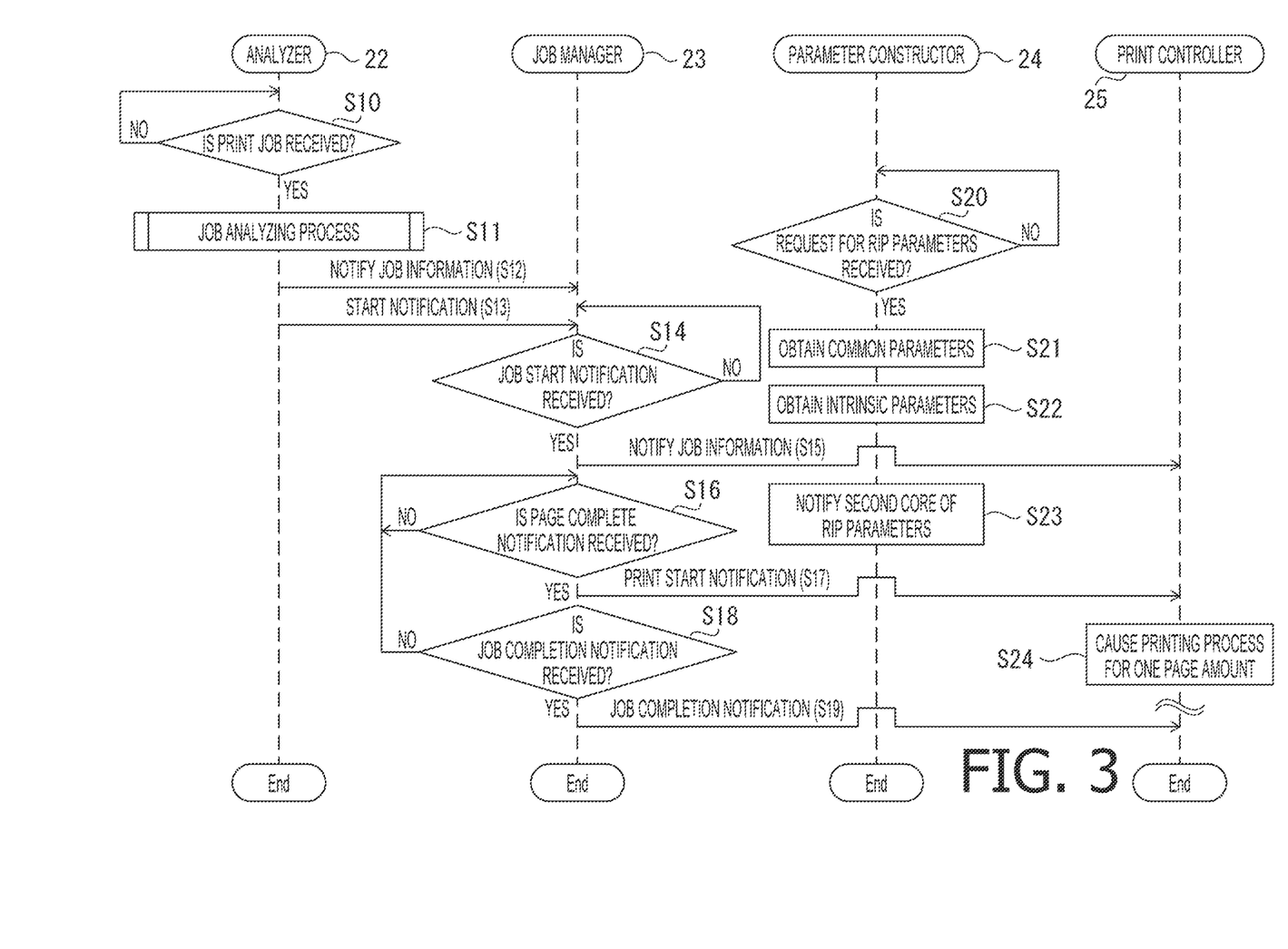
FIG. 3 shows procedures performed by a first core of a first controller.
Figure 4:
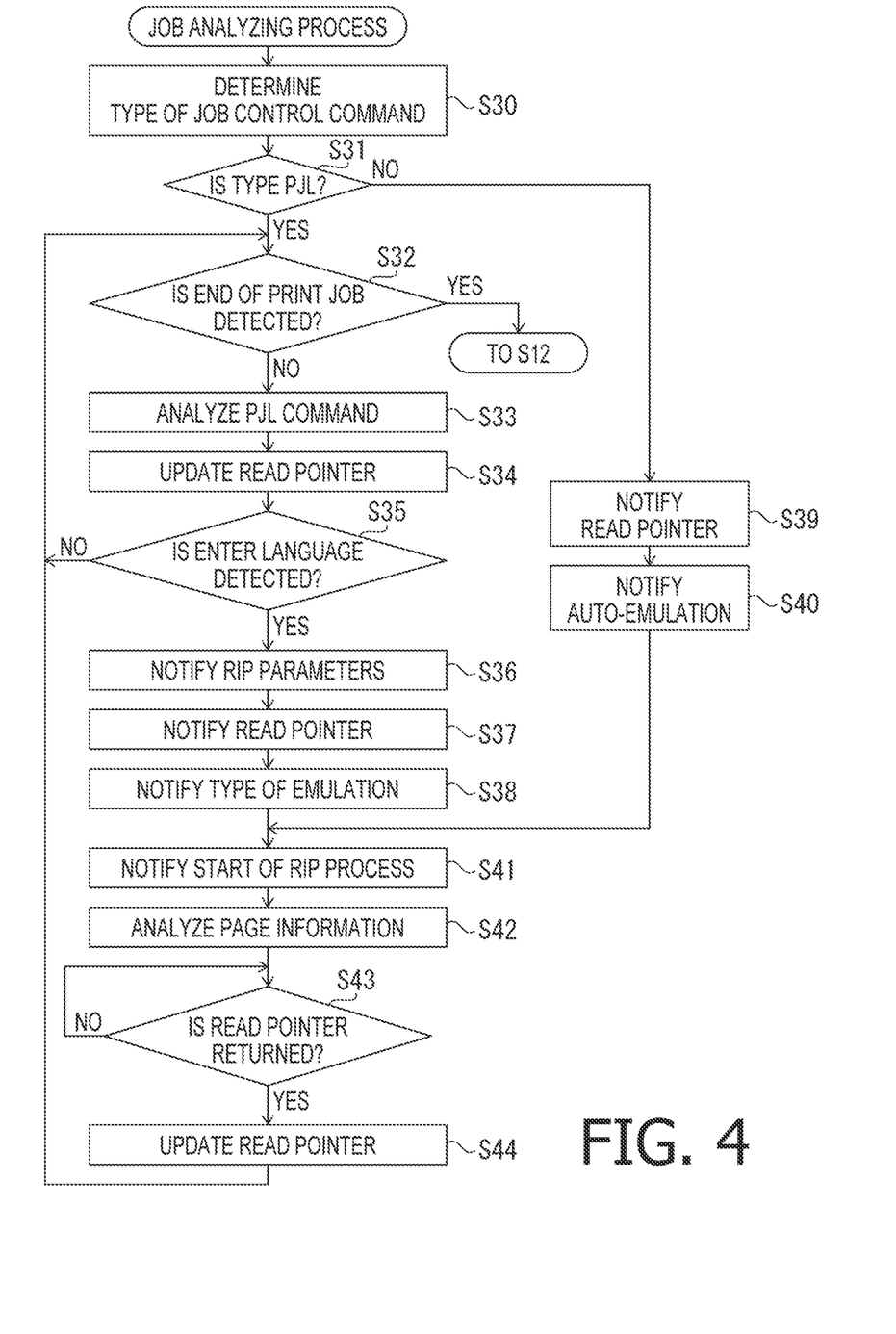
FIG. 4 is a flowchart illustrating a job analyzing process performed by the first core.

Next, the procedure of the first controller 11 when performing the printing process will be explained with reference to the drawings. FIGS. 3 and 4 are processes executed by the first core 20. In FIG. 3, functions realized by the first core 20 are indicated as an analyzer 22, a job manager 23, a parameter constructor 24, and a print controller 25. The first controller 11 realizes the functions of each of the sections 22, 23, 24 and 25 by executing not-shown programs stored in the memory 14.

In S10 of FIG. 3, the analyzer 22 determines whether or not a print job JD transmitted from the terminal 30 has been received. When receiving the print job JD, the analyzer 22 proceeds to S11, analyzes the PJL and PDL commands included in the received print job JD, and notifies analysis results to the second core 21. When the analyzer 22 does not receive the print job JD (S10: NO), the analyzer 22 waits (i.e., repeats S10).

FIG. 4 shows a flowchart illustrating the job analyzing process performed by the analyzer 22 in S11 of FIG. 3. In S30, the analyzer 22 determines the type of the job control command contained in the print job JD. Concretely, the analyzer 22 determines the type of the job control command by analyzing the header area H in the print job JD. In a case of the print job JD shown in FIG. 2, since the tag "@PJL" is included at the beginning of the command, the analyzer 22 determines that the job control command is the PJL command, and proceeds to S32. When the header area H is not included at the beginning of the print job JD transmitted from the terminal 30, the analyzer 22 is unable to determine the type of the job command, makes a negative decision (S31: NO) and proceeds to S39. For example, when the print job JD sent from the terminal 30 consists only of the PDL commands, the head of the print job JD does not contain the header area H.

When the job control command is the PJL command (S31: YES), the analyzer 22 proceed to S32 to determine whether or not the command at the end of the print job JD has been detected. When S32 is executed first time, since the analysis of the print job JD has not been reached to the end of the print job JD, the analyzer 22 makes a negative decision (S31: NO), and proceeds to S33.

In S33, the analyzer 22 analyzes the command specified by a read pointer in the print job JD. The read pointer is a variable that specifies the address on the memory 14 of the command to be analyzed. In the analysis of the header area H of the print job JD, the PJL command specified by the read pointer is analyzed, and parameters contained in the PJL command are temporarily stored in the memory 14. The PJL command contains parameters indicating identification information, print setting information, and an emulation type. In this embodiment, the process performed by the first core 20 at S33 is an example of the analyzing process.

The identification information includes a device name, which is information that identifies the printing apparatus 10, and a login user name, which is information that identifies the user of the terminal 30. The print setting information is information specified when a print job JD is generated by the printer driver, and includes the name of the print job JD, the date and time of generation of the print job JD, a confidential print, a color type (e.g., full color, monochrome), a resolution, a brightness, a character code type of the characters to be printed, and a designation of the eject tray. The emulation type is, for example, PostScript, PCL (abbreviation for Printer Control Language), or RTIFF. In the print job JD shown in FIG. 2, the PJL command of "@PJL ENTER LANGUAGE=PCLXL" is included in the header area H. Accordingly, from this command, it is determined that the emulation type is "PCLXL." In this embodiment, the emulation type is an example of a type of a print job.

In S34, the analyzer 22 updates the read pointer from the value specifying the current command to the value specifying the next command in the memory 14. In S35, the analyzer 22 determines whether a command "@PJL ENTER LANGUAGE PCLXL" indicating the end of the header area H has been detected by the analysis of S33. When the analyzer 22 makes a negative decision (S35: NO), the analyzer 22 returns to S32.

As the analyzer 22 makes the negative decisions in S35 and S32, and sequentially executes the processes of S33 and S34, the location specified by the read pointer reaches the command "@PJL ENTER LANGUAGE PCLXL" located at the end of the header area H. Therefore, the analyzer 22 makes the affirmative decision (S35: YES), and proceeds to S36. When the analyzer 22 makes the affirmative decision in S35, the read pointer after the update in S34 is the value indicating the command at the beginning of body area B.

In S36, the analyzer 22 notifies the second core 21 of the RIP parameter analyzed in S33. The RIP parameter is a parameter, among the parameters analyzed from the header area H that is used in the RIP process. Concretely, the analyzer 22 requests the parameter constructor 24 for the RIP parameter. As shown in FIG. 3, when the parameter constructor 24 receives the request for the RIP parameter from the analyzer 22, the analyzer 22 makes an affirmative decision (S20: YES) and proceeds to S21. When an auto-emulation, which will be described later, is performed, a request for the RIP parameter is made from the second core 21 (see S60 in FIG. 5). When the parameter constructor 24 does not receive a request for the RIP parameter (S20: NO), the parameter constructor 24 pauses.

In S21, the parameter constructor 24 retrieves common parameters from the memory 14 among the parameters stored in the memory 14. The common parameters are parameters, among the RIP parameters, that are common regardless of the emulation type. In S22, intrinsic parameters are retrieved from the memory 14. The intrinsic parameters are parameters, among the RIP parameters, that correspond to the emulation types, respectively. In S23, the common parameters and the intrinsic parameters retrieved from the memory 14 in S21 and S22 are notified to the second core 21.

Returning to FIG. 4, the analyzer 22 notifies the value of the current read pointer, that is, the value indicating the top PDL command of the body area B, to the second core 21. In S38, in accordance with the result of the analysis in S33, the analyzer 22 notifies the emulation type of the print job JD to the second core. The processes of S36, S37 and S38 performed by the first core 20 are examples of the parameter notification process.

In S41, the analyzer 22 notifies the start of the RIP process to the second core 21. As the start of the RIP process is notified to the second core 21 in S41, the second core 21 starts the RIP process for the body area B that starts with the command specified by the read pointer notified in S37. In the present embodiment, by duplicating the print job JD on the memory 14, the second core 21 performs the RIP process on the duplicated print job JD. The duplicated print job JD is configured with the header area H, the body area B, and the footer area F, similar to the original print job JD, and the arrangement of the PJL and PDL commands is also the same as that of the original print job JD. Therefore, when the read pointer is a relative address with the origin at the beginning of the print job JD and the value of the read pointer is the same, the command specified by the read pointer indicates the same command in the original print job JD and in the duplicated print job JD. The process executed in S41 by the first core 20 is an example of a start notification process.

Next, referring to FIG. 5, a process performed by the second core 21 will be described. In S50, the second core 21 determines whether the notification is received from the first core 20. When it is determined that the notification has not been received from the first core 20 (S50: NO), the second core 21 waits (i.e., repeats S50). In the present embodiment, the operation mode of the second core 21 shifts to the sleep mode when no instruction is received from the first core 20 (S50: NO) for a particular time period, and the sleep mode is maintained until the second core 21 receives the notification from the first core 20. When it is determined that the notification is received from the first core 20 (S50: YES), the second core 21 proceeds to SM. When proceeding to SM, the current operation mode of the second core 21 is the sleep mode, the operation mode shifts to the operating mode, while, when the operation mode of the second core 21 has already shifted to the operating mode, the operating mode is maintained. In the present embodiment, the second core 21 determines whether the second core 21 has to be recovered from the sleep mode in S50. Alternatively or optionally, for example, the first core 20 may be configured to determine whether or not the second core 21 should be restored from the sleep mode, and when the second core 21 is determined to be restored, the first core may shift the operation mode of the second core 21 from the sleep mode to the operating mode the first core 20 before transmitting a notification to the second core 21 in S50.

Then, the second core 21 proceeds to S52 to determine whether the notification from the first core 20 is a notification of the RIP parameters. When the first core 20 has made the notification in S36 (S52: YES), the second core 21 proceeds to S53. In S53, the RIP parameters constructed by the parameter constructor 24 are set as parameters to be used for the RIP process. After execution of S53, the second core 21 returns to S50.

When a negative decision is made in S52, the second core 21 proceeds to S54 to determine whether the notification from the first core 20 contains the value of the read pointer. When the first core 20 has made the notification in S37, the second core 21 makes the affirmative decision (S54: YES) and proceeds to S55. In S55, the second core 21 sets the value of the read pointer notified by the first core 20 as the value indicating the top command of the body area B. After completing S55, the second core 21 returns to S50.

When a negative decision is made in S54, the second core 21 proceeds to S56 to determine whether the notification from the first core 20 contains a notification of the emulation type. When the first core 20 has made the notification in S38, the second core 21 makes an affirmative decision (S56:

YES), and proceeded to S57. In S57, the second core 21 sets the emulation type notified by the first core 20 to the emulation type of the print job JD. After completing S57, the second core 21 returns to S50.

When the negative decision is made in S56, the second core 21 proceeds to S58 to determine whether the notification from the first core 20 is a notification indicating the start of the auto-emulation. It is noted that the auto-emulation is a process to make the second core 21 determine the emulation type when the emulation type cannot be determined by the first core 20. The first core 20 notifies the start of the auto-emulation in S40 of FIG. 4, described later. When the negative decision is made in S58, the second core 21 proceeds to S62. A case where the negative decision is made in S58 will be described later.

In S62, the second core 21 determines whether the notification from the first core 20 is a notification of the start of the RIP process. When the notification from the first core 20 is not the notification of the start of the RIP process (S62: NO), the second core 21 returns to S50. When the notification from the first core 20 is the notification of the start of the RIP process (S62: YES), the second core 21 proceeds to S63 and performs the RIP process. In the present embodiment, as the second core 21 performs the RIP process, the analyzing process and the RIP process in the printing process can be performed by the two processor cores in a distributed manner, the processing load on the processor cores can be reduces.

Figure 5:
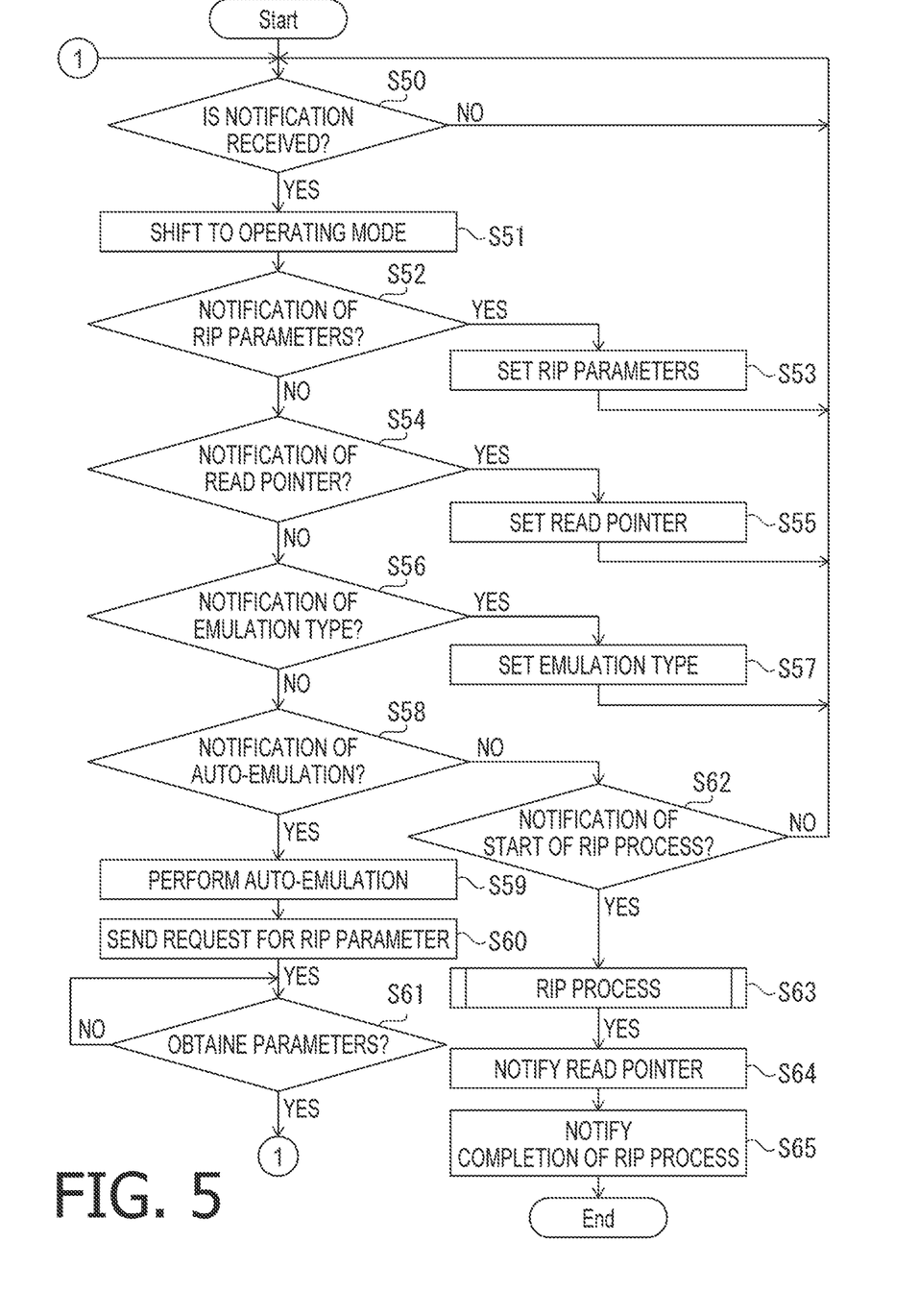
FIG. 5 is a flowchart illustrating a process performed by a second core of the first controller.
Figure 6:
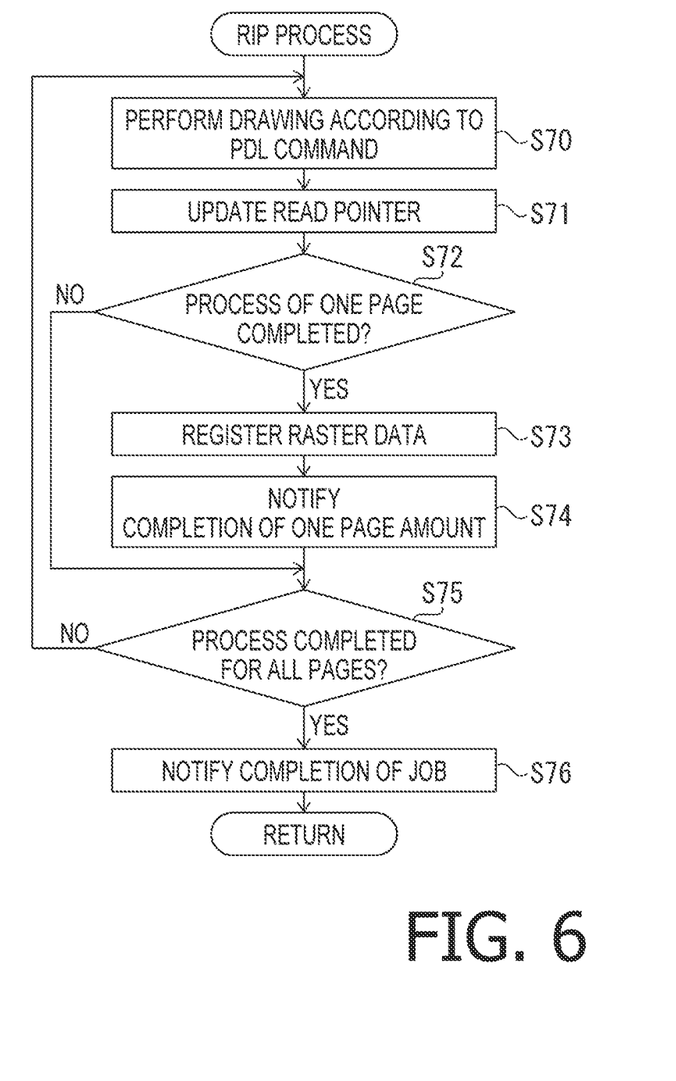
FIG. 6 is a flowchart illustrating a RIP process performed by the second core.

FIG. 6 shows the RIP process called in S63 of FIG. 5 in detail. In S70, the second core 21 analyzes the PDL command in the duplicated print job JD and performs drawing to generate the raster data. At this time, the second core 21 performs the drawing by applying the RIP parameters that have already been set. In the present embodiment, the raster data is data that has three color values (i.e., values of red (R) component, green (G) component, and blue (B) component) for each pixel. The raster data generated by the second core 21 is recorded in the print data storage area of the memory 14. In S71, the second core 21 updates the read pointer to a value indicating the next PDL command.

In S72, the second core 21 determines whether the raster data for one page has been generated. When the raster data for one page has not been generated (S72: NO), the second core 21 goes to S75 to determine whether the raster data for all the pages in the print job JD has been generated. When the raster data for all the pages in the print job JD has not been generated (S75: NO), the second core 21 returns to S70.

After repeatedly performing the processes of S70 and S71, when the second core 21 determines that the raster data for one page has been generated (S72: YES), the second core 21 proceeds to S73. In S73, the second core 21 causes the job manager 23 to register the generated raster data for one page as the raster data to be printed. In S74, the second core 21 performs a completion notification to notify the job manager 23 that the raster data for one page has been generated.

In S75, the second core 21 determines whether the raster data corresponding to all the pages in the print job JD has been generated. When the raster data corresponding to all the pages in the print job JD has not been generated (S75: NO), the second core 21 returns to S70 and generates the raster data corresponding to the remaining pages. After repeatedly performing the processes from S70 to S74, when the second core 21 determines that the raster data for all the pages in the print job JD has been generated (S75: YES), the second core 21 proceeds to S76 and notifies the job completion notification indicating that the RIP process for one print job JD has been completed (S76). Then, the second core 21 proceeds to S64.

Returning to FIG. 5, the second core 21 notifies the value of the read pointer when the RIP process in S63 has been completed, that is, the value indicating the top command of the footer area F, to the first core 20 in S64. In S65, the second core 21 notifies a completion notification of the RIP process to the job manager 23 of the first core 20.

Returning to FIG. 4, in the present embodiment, the analyzer 22 of the first core 20 analyzes page information from the body area B in the print job JD in S42 in a period during which the processes shown in FIG. 5 are performed by the second core 21. The page information is information that specifies the PDL data corresponding to one page on the body area B. Concretely, the page information is information specifying from which byte to which byte corresponds to the PDL data for one page, and from which byte to which byte corresponds to the PDL data for two pages in the body area B.

In S43, the analyzer 22 determines whether the read pointer has been returned by the second core 21. When the read pointer is returned by the second core 21 (i.e., when the process in S64 is performed) (S43: YES), the analyzer 22 proceeds to S44. When the negative decision is made in S43, the analyzer 22 pauses. In S44, the analyzer 22 updates the current value of the read pointer to the value of the read pointer returned from the second core 21.

Returning to S32, the analyzer 22 determines whether the command at the end of the print job JD has been detected. When the analyzer 22 proceeds to S32 via S44, the read pointer indicates the top command of the footer area F in the print job JD. By making the negative decision in S32 and repeating S33, S34 and S35, the analyzer 22 detects the command "EC %-12345" at the end of the footer area F based on the analysis in S33. Then, the analyzer 22 made the affirmative decision (S32: YES) and proceeds to S12 in FIG. 3.

In S12, the analyzer 22 notifies the job information among the analysis results in S11 to the job manager 23. In S13, the analyzer 22 notifies the job manager 23 of the start of the printing process. Ins S14, the job manager 23 determines whether the start notification has been received. When the job manager 23 receives the start notification from the analyzer 22 in (S14: YES), the analyzer 22 proceeds to S15. In S15, the analyzer 22 notifies the job information received from the analyzer 22 to the print controller 25. For example, the job manager 23 can, with use of the received page information, manage the raster data for each page stored in the memory 14, and generate an indicator image to show a degree of progress of the printing process. When the job manager 23 does not receive the start notification (S14: NO), the analyzer 2 pauses.

In S16, the job manager 23 determines whether a page completion notification is received from the second core 21. When receiving the page completion notification (S74 in FIG. 6) indicating that the raster data for one page has been generated from the second core 21 (S16: YES), the job management section 23 proceeds to S17 and makes a print start notification to the print controller 25 to print the raster data for one page. When receiving the print start notification from the job manager 23, in S24, the print controller 25 converts the raster data for one page stored in the print data storage area into data that can be processed by the print engine 17 and causes the print engine 17 to perform the printing process.

Concretely, in S24, the print controller 25 performs a color conversion process of converting the value of each color R, G, and B of the each pixel of the raster data to values corresponding to the recording agent. Further, the print controller 25 converts the data after the color conversion process into binary data that can be processed by the print engine 17. The print controller 25 causes the print engine 17 to perform printing for one page using the binarized data. The job manager 23 transmits a print start notification to the print controller 25 every time the job manager 23 receives a page completion notification from the second core 21.

When receiving the job completion notification (S76 in FIG. 6) from the second core 21 in S18, the job manager 23 proceeds to S19 and sends the job completion notification to the print controller 25. Thus, the print controller 25 terminates the process in S24.

Next, a process when the analyzer 22 cannot determine the type of the job control command and therefore cannot determine the emulation type in S31 of FIG. 4 is described. When the analyzer 22 cannot determine the type of the job control command (S31: NO), the analyzer 22 proceeds to S39 and the current read pointer value is notified to the second core 21. In S40, the analyzer 22 notifies the start of the auto emulation to the second core 21. As described above, the "auto emulation" is a process to cause the second core 21 to analyze the emulation type.

When the second core 21 receives the start notification of the auto-emulation by the first core 20 in S40, the second core 21 make negative decision in S52, S54 and S56 and proceeds to S59 to execute the auto-emulation in FIG. 5. As a result, the emulation type is determined according to the analysis result of the body area B in the duplicated print job JD. In the example of FIG. 2, the second core 21 determines that the emulation type is "PCL XL" from the command "PCL XL" contained in the body area B.

In S60, the second core 21 sends a request to obtain the RIP parameters to the first core 20 according to the emulation type determined by the auto-emulation in S59. In this case also, when receiving a request for obtaining the RIP parameters from the second core 21 in S20 of FIG. 3, the parameter constructor 24 constructs the RIP parameters according to the emulation type identified by auto-emulation, and notifies the constructed RIP parameters to the second core 21 (S21-S23).

When the second core 21 obtains the RIP parameters notified by the first core 20 (S61: YES), the second core 21 returns to S50.

When the second core 21 receives the start notification of the RIP process by the first core 20 in S41 (S52: NO; S54: NO; S56: NO; S58: NO; S62: YES), the second core 21 proceeds to S63 to start the RIP process.

According to the above-described embodiment, the following effects can be achieved.

The first controller 11 has the first core 20 configured to perform the analyzing process to analyze the job control commands included in the print job JD, and the second core 21 configured to perform the RIP process to generate the raster data from the PDL commands, when the printing process is being performed. Such a configuration allows different processor cores to perform the analysis of the job control command and the process of generating the raster data from the PDL command, in the printing process. Therefore, the processing load can be distributed between the two processor cores to suppress any negative impact, from the processing load, on the output of the printing process.

The first core 20 is configured to notify the second core 21 of each parameter according to the analysis result of the print job JD before notifying the second core 21 to start the RIP process. In the RIP process, the second core 21 generates the raster data from the PDL command according to each parameter. As a result, even in a configuration in which the parameters used to perform the RIP process are analyzed from the print job JD, the analyzing process and the RIP process can be distributed and performed by the two cores.

The first core 20 is configured to identify the emulation type based on the job control command, and the first core 20 is configured to notify the second core 21 of the parameters according to the identified emulation type as the RIP parameters. The second core 21 is configured to generate the raster data from the PDL command according to the RIP parameters. As a result, even when analyzing the RIP parameters used for the RIP process from the print job JD, the analyzing process and the RIP process can be distributed and performed by the two cores.

When the emulation type of the print job JD is not identified based on the job control command, the first core 20 causes the second core 21 to perform the auto-emulation to identify the emulation type. The first core 20 is configured to inform the second core 21 of the RIP parameters corresponding to the emulation type identified by the second core 21. Accordingly, even when the drawing type of the print job JD cannot be identified by the first core 20, the RIP process by the second core 21 can be kept to continue.

The first controller 11 is configured to store the print job JD in the memory 14 that can be referenced by each of the first core 20 and the second core 21. After performing the analyzing process, the first core 20 is configured to notify the PDL command specified by the read pointer to the second core 21. The second core 21 is configured to start the RIP process by referring to the value of the read pointer notified by the first core 20. As a result, the first core 20 and the second core 21 can refer to the print job JD stored in the memory 14 and perform the analyzing process and the RIP process. As a result, compared with a case where the print job JD is stored in separate memories 14, the memory resources can be effectively utilized.

When the print job JD corresponds to a plurality of pages, the first core 20 sequentially performs analysis on the plurality of pages of the print job JD and stores the analysis results in the memory 14. The first core 20 informs the second core 21 of each of the stored parameters for the plurality of pages. As a result, the analyzing process by the first core 20 and the RIP process by the second core 21 can be performed in parallel, thereby improving the process speed in the printing process compared to a case where the analyzing process and the RIP process are performed alternately.

The second core 21 is a processor core configured to perform only the RIP process. Since the RIP process, which has a high processing load, is performed by the second core 21, which is a dedicated processor core, thereby suppressing adverse effects on other processes performed by the first core 20.

The first controller 11 shifts the operation mode of the second core from the operating mode to the sleep mode when the second core 21 does not perform the RIP process. The operating mode is a mode in which the second core 21 can perform the RIP process, and the sleep mode is a mode in which the power consumption is lower than the operating mode. According to this configuration, since the operation mode of the second core 21 shifts from the operating mode to the sleep mode in the period when the RIP process is not performed by the second core 21, the power consumption of the first controller 11, which includes both the first core 20 and the second core 21, can be reduced.

Modification of First Embodiment

In the first embodiment, when the emulation type cannot be identified, the first controller 11 causes the second core 21 to perform the auto-emulation to identify the emulation type (FIG. 4: S40).

Alternatively, the first controller 11 may be configured to notify the second core 21 of RIP parameters corresponding to a particular emulation type when the emulation type cannot be identified. In such a case, when the RIP parameters are notified in S36 of FIG. 3, if the emulation type has not been identified, the first controller 11 may be configured to notify the RIP parameters corresponding to the "Post-Script" to the second core 21. Similarly, if the emulation type has not been identified, the first controller 11 may notify "PostScript" as the emulation type in S38. In such a configuration, the processes of S31, S39 and S40 in FIG. 4 and the processes of S58 to S61 in FIG. 5 may be deleted, and when it is determined that the notification of the emulation type is not received (S56: NO), the second core 21 may proceed to S62.

In the embodiment described above, when the emulation type is not identified based on the job control command, the first core 20 is configured to notify the second core 21 of the RIP parameters corresponding to a particular emulation type. According to this configuration, the second core 21 can continue the RIP process even when the emulation type cannot be identified by the job control command.

Second Embodiment

In the second embodiment, a configuration different from that of the first embodiment will be mainly described. In the description of the second embodiment, the same reference numerals are assigned for the same portions as in the first embodiment, and the description thereof will not be repeated.

Figure 7:
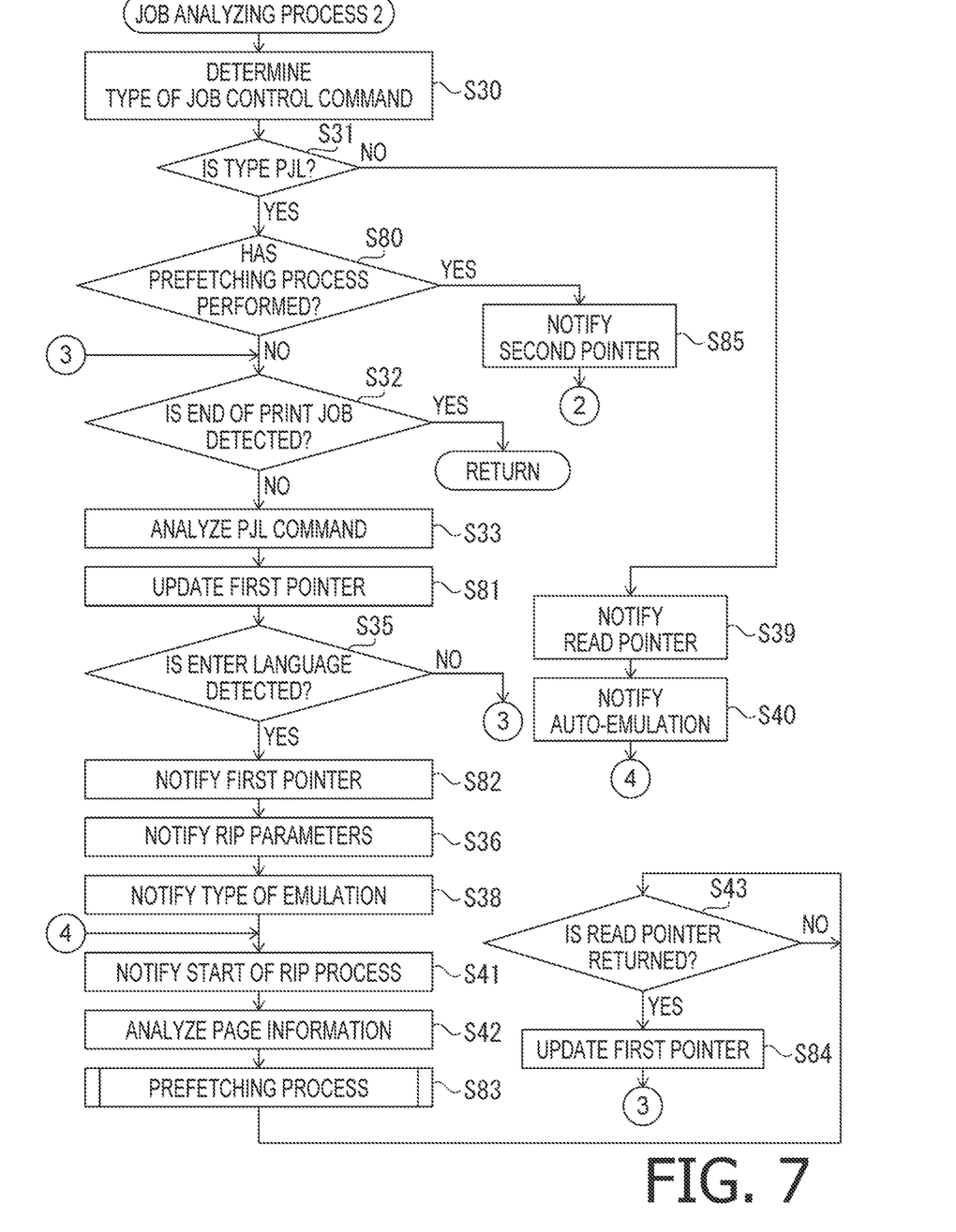
FIG. 7 is a flowchart illustrating a job analyzing process according to a second embodiment.

In the present embodiment, when the printing apparatus 10 continuously receives multiple print jobs JD from the terminal 30, during the performing of the RIP process by the second core 21, the first core 20 analyzes the PJL command for the print job which is being received subsequently. FIG. 7 is a flowchart illustrating a job analyzing process 2 which is performed by the analyzer 22 of the first core 20 in S11 according to the second embodiment.

In S31, when the type of the job control command is the PJL, the analyzer 22 proceed to S80 to determine whether a prefetching process has already been performed. The prefetching processing will be described later.

When it is determined that the prefetching process has not been performed (S80: NO), the analyzer 22 proceeds to S32. In S32, when it is determined that the command at the end of the print job JD has not been detected (S32: NO), the analyzer 22 proceeds to S33 and then S81. In S81, the analyzer 22 updates the first pointer among the read pointers.

In the second embodiment, two pointers, i.e., the first pointer and the second pointer, are used as the read pointers. The first pointer is used to designate the command to be analyzed by the analyzer 22. The second pointer is used to designate a top command of the commands analyzed in the prefetching process. The steps from S35 to S42 are the same as those in the first embodiment (see FIG. 4).

In S83, the analyzer 22 performs the prefetching process. The prefetching process is a process in which the analyzer 22 analyzes the PJL command for the print job JD received next to the print job JD for which RIP processing is currently being performed. As the prefetching process is performed, the RIP process by the second core 21 and the analysis of the PLJ command for the subsequently received print job JD by the first core 20 are performed in parallel.

Figure 8:
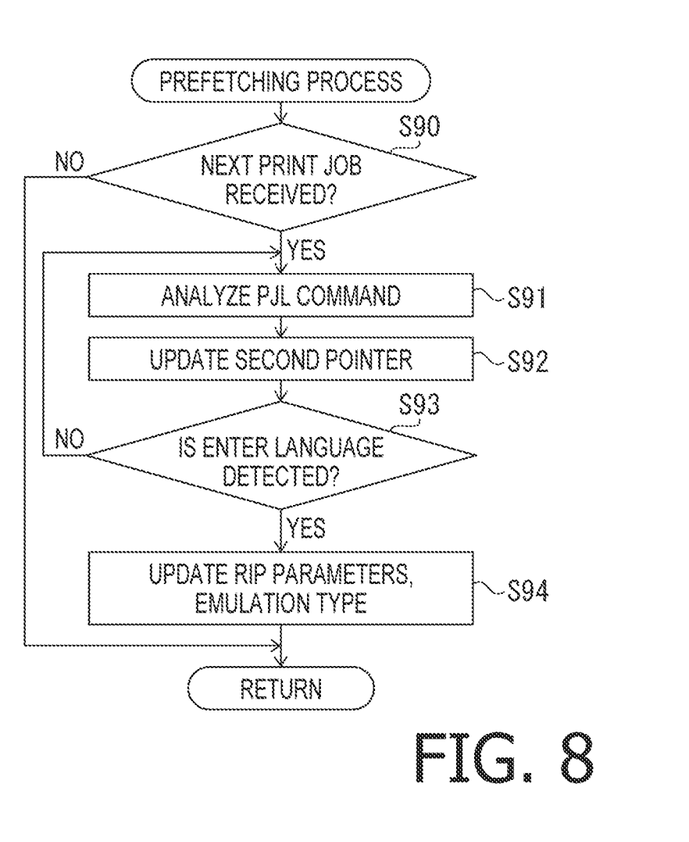
FIG. 8 is a flowchart illustrating a process performed in the job analyzing process shown in FIG. 7.

FIG. 8 is a flowchart illustrating a prefetching process called in S83 of FIG. 7. In S90, the analyzer 22 determines whether a new print job JD is received separately from the print job JD subjected to the current printing process. When the new print job JD is not received (S90: NO), analyzer 22 terminates the prefetching process and proceeds to S43 of FIG. 7. On the other hand, when it is determined that the new print job JD is received (S90: YES), the analyzer 22 analyzes the PJL command for the newly received print job JD. In the following description, the newly received print job JD is also referred to as the next print job JD. When S91 is firstly executed, the analyzer 22 firstly analyzes the PJL command at the beginning of the header area H in the next print job JD. In S92, the analyzer 22 updates the value of the second pointer to the value indicating the next command in the header area H.

In S93, the analyzer 22 determines whether the end of the header area H (i.e., @PJL ENTER LANGUAGE=PCLXL) in the next print job JD is detected. When the analyzer 22 has not detected the end of the header area H in the next print job JD (S93: NO), the analyzer 22 returns to S91 to analyze the PJL command indicated by the second pointer. After repeatedly executing S91 and S92, when the analyzer 22 detects the end of the header area H (S93: YES), the analyzer 22 proceeds to S94. In S94, the analyzer 22 updates the RIP parameters and emulation type to the print parameters and emulation type for the next print job JD according to the analysis result of S91. Then, the analyzer 22 proceeds to S43 of FIG. 8.

In S43, the analyzer 22 determines whether the second core 21 has returned the read pointer in response to termination of the RIP process. When the analyzer 22 has not received the read pointer from the second core 21 (S43: NO), the analyzer 22 pauses. On the other hand, when the analyzer 22 has received the read pointer from the second core 21 (S43: YES), the analyzer 22 proceeds to S84 and updates the value of the first pointer to the value of the read pointer replied by the second core 21. Then, the analyzer 22 returns to S32. When the data end of the print job JD, i.e., the command of "EC %-12345X" has not been detected (S32: NO), the analyzer 22 proceeds to S33 to analyze the PJL command, and then, S81 to update the first pointer. When the analyzer 22 has not detected the enter language (S35: NO), the analyzer 22 returns to S32. When the end of the print job JD is detected (S32: YES), the analyzer 22 terminates the job analyzing process shown in FIG. 7.

Next, the job analyzing process 2 for a newly received print job JD which is performed after the prefetching process in S83 has already been performed will be described. When the type of the control command is determined to be the PJL (S31: YES), the analyzer 22 proceeds to S80 to determine whether the prefetching process has already been performed. When prefetching process has already been performed (S80: YES), the analyzer 22 proceeds to S85 to notify the second core 21 of the value of the second pointer. As described above, the value of the second pointer has been updated, in the previously performed prefetching process, to indicate the command at the beginning of the body area B in the print job JD subjected to the current printing process.

After execution of S85, the analyzer 22 proceeds to S36 to notify the RIP parameters, and then, to S38 to notify the emulation type. Each parameter notified in S36 and S38 is the parameter updated in S94 in the prefetching process in the previous process. In S41, the analyzer 22 notifies the second core 21 of the start of the RIP process. Accordingly, when the analysis of the PJL command has been completed in the prefetching process in S83 in the previous print process, the analyzer 22 causes the second core 21 to start the RIP process without analyzing the header area H for the print job JD subjected to the print process in the current print process.

After execution of S42, the analyzer 22 performs the prefetching process for the next print job JD in S83. Then, after execution of S43 and S84, when the command at the end of the print job JD is detected in S32, the job analyzing process 2 shown in FIG. 7 is terminated.

In the second embodiment described above, when the first core 20 of the first controller 11 has received multiple print jobs JD from the terminal 30, the first core 20 sequentially analyzes each of the multiple print jobs JD and stores the analysis results in the memory 14. Then, the first core 20 notifies each of the parameters in the multiple print jobs JD to the second core 21 in the parameter notification process. Accordingly, when multiple print jobs JD are received from the terminal 30, the first core 20 can improve the processing speed in the printing process compared to a case where the analyzing process and the RIP process are performed alternately.

Other Embodiments

The technology disclosed herein is not necessarily limited to the above-mentioned embodiments, but can be modified into various forms to the extent that the modifications do not deviate from aspects of the present disclosures. For example, the following modifications are possible. It is only necessary that the first controller 11 has a processor core that performs the analyzing process and a processor core that performs the RIP process, separately. In this regard, the first controller 11 may have three or more processor cores.

The memory in which the print job JD is stored may be an external memory that can be detachably connected to the printing apparatus 10, in addition to or in place of the memory provided inside the printing apparatus 10. For example, a USB or flash memory may be used as the external memory. In such a case, the first core 20 and the second core 21 may be configured to refer to the print job JD stored in the external memory.

The print job JD that is referenced by the first core 20 to analyze the PJL command and the print job JD that is referenced by the second core 21 to analyze the PDL command may be stored in separate memories. In such a case, it is only necessary for the first controller 11 to have separate memories including a memory referenced by the first core 20 and another memory referenced by the second core 21.

Shifting the operation mode of the second core 21 to sleep mode during the period when the second core 21 is not performing the RIP processing is only an example, and the second core 21 may remain in the operating mode without shifting to sleep mode during the period when the second core 21 is not performing the RIP processing.

It is only necessary for the printing apparatus 10 to have the first controller 11 provided with the first core 20 and the second core 21. Therefore, the printing apparatus 10 may be equipped with a single controller having functions of the first through third controllers 11-13.

The printing apparatus may be an MFP (multi-function peripheral). In such a case, the MFP is equipped with a scanner engine and a facsimile engine. The scanner engine is configured to perform scanning operations to read images recorded on a document and generate image data representing the scanned image, and the facsimile engine is configured to perform a facsimile operation to transmit and receive image data in a method compliant with the facsimile protocol.

What is claimed is:

1. A printing apparatus, comprising:
   a print engine; and
   a controller,
   wherein the controller is configured to generate raster data based on a print job and control the print engine to perform printing based on the generated raster data, the print job being data containing a job control command and a PDL command, the job control command being a command to control the print job, a PDL command being a command to generate the raster data,
   wherein the controller comprises:
      a first core which is a processor core configured to perform, in the printing, an analyzing process, the analyzing process being a process to analyzing the job control command contained in the print job; and
      a second core which is another processor core configured to perform a RIP process, the RIP process being a process of generating the raster data based on the PDL command;
   wherein the first core is configured to:
      perform the analyzing process of analyzing the job control command included in the print job when the first core obtains the print job; and
      after performing the analyzing process, perform a start notification process when the PDL command included in the print job is detected in the analyzing process, the start notification process being a process of notifying the second core of a start of the RIP process for the detected PDL command, and
   wherein the second core starts the RIP process when receiving a notification by the start notification process.

2. The printing apparatus according to claim 1,
   wherein the first core performs a parameter notification process of notifying a parameter, the parameter being a parameter obtained by the print job by the analyzing process, the parameter being a parameter to be used when the second core performs the RIP process and
   wherein the second core generates the raster data from the PDL command according to the parameter in the RIP process.

3. The printing apparatus according to claim 2,
   wherein the parameter includes a RIP parameter,
   wherein the first core is configured to identify a type of the print job based on the job control command in the analyzing process, and
   wherein the parameter notification process includes notifying the second core of the RIP parameter according to a type of the identified print job, and
   wherein the second core is configured to generate the raster data from the PDL command in accordance with the RIP parameter in the RIP process.

4. The printing apparatus according to claim 3,
   wherein, when the first core does not identify the type of the print job based on the job control command in the analysis process, the first core causes the second core to identify the type of the print job based on the PDL command, and wherein, after the type of the print job is identified by the second core, in the parameter notification process, the first core notifies the second core of the RIP parameter according to the type of the print job identified by the second core.

5. The printing apparatus according to claim 3, wherein, when the first core does not identify the type of the print job based on the job control command in the analysis process, in the parameter notification process, the first core notifies the second core of the RIP parameter according to the print job of a particular type.

6. The printing apparatus according to claim 2, wherein the controller is configured to store the print job in a memory, the print job being referable by the first core and the second core, wherein the parameter notification process performed by the first core includes notifying the second core of a position of the detected PDL command in the memory, and wherein the second core generates, in the RIP process, the raster data by referring to the PDL command stored at the position in the memory notified in the parameter notification process.

7. The printing apparatus according to claim 2, wherein, when the print job corresponds to page images of multiple pages, the first core is configured to:

analyze the multiple pages of the print job by the analyzing process; and notify the second core of the parameter of each of the multiple pages in the parameter notification process.

8. The printing apparatus according to claim 2, wherein, when the first core has obtained multiple print jobs, the first core is configured to:

sequentially analyze each of the multiple print jobs in the analyzing process; and notify the second core of the parameter in each of the multiple print jobs in the parameter notification process.

9. The printing apparatus according to claim 1, wherein the second core is a processor core configured to perform only the RIP process.

10. A printing apparatus, comprising:
a print engine; and
a controller,
wherein the controller is configured to generate raster data based on a print job and control the print engine to perform printing based on the generated raster data, the print job being data containing a job control command and a PDL command, the job control command being a command to control the print job, a PDL command being a command to generate the raster data,
wherein the controller comprises:
a first core which is a processor core configured to perform, in the printing, an analyzing process, the analyzing process being a process to analyzing the job control command contained in the print job; and
a second core which is another processor core configured to perform a RIP process, the RIP process being a process of generating the raster data based on the PDL command;
wherein the controller includes a first controller and a second controller, the first controller including the first core and the second core, the second controller performing processes other than the analyzing process and the RIP process.

11. A printing apparatus, comprising:
a print engine; and
a controller,
wherein the controller is configured to generate raster data based on a print job and control the print engine to perform printing based on the generated raster data, the print job being data containing a job control command and a PDL command, the job control command being a command to control the print job, a PDL command being a command to generate the raster data,
wherein the controller comprises:
a first core which is a processor core configured to perform, in the printing, an analyzing process, the analyzing process being a process to analyzing the job control command contained in the print job; and
a second core which is another processor core configured to perform a RIP process, the RIP process being a process of generating the raster data based on the PDL command;
wherein, when the RIP process is not performed by the second core, the controller causes the second core to shift a mode of the second core from an operating mode to a sleep mode, the operating mode being a mode in which the RIP process can be performed, the sleep mode being a mode in which power consumption is lower than power consumption in the operating mode.

12. A printing apparatus, comprising:
a print engine; and
a controller,
wherein the controller is configured to generate raster data based on a print job and control the print engine to perform printing based on the generated raster data, the print job being data containing a job control command and a PDL command, the job control command being a command to control the print job, a PDL command being a command to generate the raster data,
wherein the controller comprises:
a first core which is a processor core configured to perform, in the printing, an analyzing process, the analyzing process being a process to analyzing the job control command contained in the print job; and
a second core which is another processor core configured to perform a RIP process, the RIP process being a process of generating the raster data based on the PDL command,
wherein the first core performs a parameter notification process of notifying a RIP parameter based on a result of the analyzing process, the RIP parameter being a parameter obtained by the print job by the analyzing process, the RIP parameter being a parameter to be used when the second core performs the RIP process, and
wherein the second core is configured to generate the raster data from the PDL command in accordance with the RIP parameter in the RIP process.

13. The printing apparatus according to claim 12, wherein the first core is configured to identify a type of the print job based on the job control command in the analyzing process, and
wherein the parameter notification process includes notifying the second core of the RIP parameter according to a type of the identified print job.

14. The printing apparatus according to claim 13, wherein, when the first core does not identify the type of the print job based on the job control command in the analyzing process, the first core causes the second core to identify the type of the print job based on the PDL command, and wherein, after the type of the print job is identified by the second core, in the parameter notification process, the first core notifies the second core of the RIP parameter according to the type of the print job identified by the second core.

15. The printing apparatus according to claim 13,
wherein, when the first core does not identify the type of the print job based on the job control command in the analyzing process, in the parameter notification process, the first core notifies the second core of the RIP parameter according to the print job of a particular type.

16. The printing apparatus according to claim 12,
wherein the controller is configured to store the print job in a memory, the print job being referable by the first core and the second core, wherein the parameter notification process performed by the first core includes notifying the second core of a position of the detected PDL command in the memory, and wherein the second core generates, in the RIP process, the raster data by referring to the PDL command stored at the position in the memory notified in the parameter notification process.

17. The printing apparatus according to claim 12,
wherein, when the print job corresponds to page images of multiple pages, the first core is configured to:
  analyze the multiple pages of the print job by the analyzing process; and
  notify the second core of each of the RIP parameters of the multiple pages in the parameter notification process.

18. The printing apparatus according to claim 12,
wherein, when the first core has obtained multiple print jobs, the first core is configured to:
  sequentially analyze each of the multiple print jobs in the analyzing process; and
  notify the second core of each of the RIP parameters in the multiple print jobs in the parameter notification process.

* * * * *

UNITED STATES PATENT AND TRADEMARK OFFICE
CERTIFICATE OF CORRECTION

PATENT NO. : 11,487,484 B2
APPLICATION NO. : 17/472832
DATED : November 1, 2022
INVENTOR(S) : Yoshihiro Itogawa It is certified that error appears in the above-identified patent and that said Letters Patent is hereby corrected as shown below:

On the Title Page

Item (57) Abstract, Line 5 should read:
core and a second core. The first core is configured to perform Item (57) Abstract, Line 6 should read:
an analyzing process of analyzing a job control command In the Claims Column 14, Claim 1, Line 27 should read:
analyzing process being a process of analyzing the Column 15, Claim 10, Line 60 should read:
analyzing process being a process of analyzing the Column 16, Claim 11, Line 17 should read:
analyzing process being a process of analyzing the Column 16, Claim 12, Line 43 should read:
analyzing process being a process of analyzing the Signed and Sealed this
Fourth Day of July, 2023

Katherine Kelly Vidal
*Director of the United States Patent and Trademark Office*